(12) United States Patent
Oshima et al.

(10) Patent No.: US 8,779,692 B2
(45) Date of Patent: Jul. 15, 2014

(54) LIGHT EMITTING ELEMENT DRIVE DEVICE

(75) Inventors: Kazunori Oshima, Tokyo (JP); Hironobu Masuoka, Tokyo (JP)

(73) Assignee: TDK Corporation (JP)

( * ) Notice: Subject to any disclaimer, the term of this patent is extended or adjusted under 35 U.S.C. 154(b) by 169 days.

(21) Appl. No.: 13/445,546

(22) Filed: Apr. 12, 2012

(65) Prior Publication Data

US 2012/0262070 A1 Oct. 18, 2012

(30) Foreign Application Priority Data

Apr. 13, 2011 (JP) ................................. 2011-088969

(51) Int. Cl.
*H05B 37/02* (2006.01)
*H05B 33/08* (2006.01)

(52) U.S. Cl.
CPC ........... *H05B 33/0887* (2013.01); *Y02B 20/341* (2013.01)
USPC ........... 315/308; 315/291; 315/307; 315/246; 315/287; 315/360

(58) Field of Classification Search
USPC .......... 315/209 R, 224, 225, 227 R, 291, 307, 315/308
See application file for complete search history.

(56) References Cited

U.S. PATENT DOCUMENTS

| 7,550,934 B1 * | 6/2009 | Deng et al. ..................... | 315/308 |
|---|---|---|---|
| 2007/0267984 A1 * | 11/2007 | Peng .............................. | 315/312 |
| 2010/0213859 A1 * | 8/2010 | Shteynberg et al. .......... | 315/224 |

FOREIGN PATENT DOCUMENTS

| CN | 101730340 A | 6/2010 |
|---|---|---|
| JP | 61-174200 | 10/1986 |
| JP | 09-331017 | 12/1997 |
| JP | 2003-007482 A | 1/2003 |
| JP | 2006-222377 | 8/2006 |
| JP | 2007-234414 A | 9/2007 |
| JP | 2010-055841 A | 3/2010 |

OTHER PUBLICATIONS

Japanese Office Action for Application No. 2011-088969 dated May 28, 2013, pp. 1-3. (With Translation).
Chinese Office Action for Application No. 2012-10109430 dated Jan. 3, 2014. (With Translation).

* cited by examiner

*Primary Examiner* — Thienvu Tran
*Assistant Examiner* — Christopher Lo
(74) *Attorney, Agent, or Firm* — Harness, Dickey & Pierce, P.L.C.

(57) ABSTRACT

A light emitting element drive device includes a light emitting unit that includes a light emitting element and that performs dimming based on a pulse width modulation (PWM) signal, a first switching element that is turned ON or OFF based on the PWM signal and that is connected in series to the light emitting unit, and a protection circuit that includes a charging circuit and a second switching element. The second switching element is turned ON when a first voltage obtained by a charging operation of the charging circuit is equal to or more than a first predetermined value. The charging circuit discharges electric charge through the first switching element when a second voltage between input and output terminals of the first switching element drops. The first switching element is turned OFF despite the existence of the PWM signal when the second switching element is turned ON.

10 Claims, 5 Drawing Sheets

ID ELEMENT DRIVE
LIGHT EMITTING ELEMENT DRIVE DEVICE

CROSS-REFERENCE TO RELATED APPLICATION

This application claims priority to Japanese Patent Application No. 2011-88969 filed Apr. 13, 2011 which is hereby expressly incorporated by reference herein in its entirety.

BACKGROUND

The present invention relates to a light emitting element drive device. Specifically, the light emitting element drive device can protect a circuit from an abnormal state by detecting an overcurrent while driving a light-emitting diode (LED) as a light emitting element.

A light emitting element, such as an LED, has been used as a lighting system and as a backlight for a display device, such as a liquid crystal panel. A protection circuit is provided at a circuit for driving the light emitting element in consideration of a malfunction of the light emitting element. For example, Japanese Patent Publication No. JP H09-331017 discloses a protection circuit that controls an electric current flowing through a light emitting element based on a voltage drop in an overcurrent detection resistor connected between a power source and the light emitting element.

Japanese Patent Publication No. JP 2006-222377 discloses a protection circuit that restrains an overcurrent, which flows when a short circuit occurs in an LED, by an electric current setting element. In this protection circuit, when the short circuit occurs in the LED, the electric current setting element that is connected in series to the LED restrains current increment so that power loss is reduced. In JP 2006-222377, a transistor is used as the electric current setting element. A collector of the transistor is connected to the LED. An emitter of the transistor is connected to a grounded part of a power source through a resistor. A base of the transistor is connected to an output of an operational amplifier. A connection point between the emitter of the transistor and the resistor is connected to an input of the operational amplifier. A reference voltage is connected to another input of the operational amplifier. Further, when a detection unit detects the short circuit of the LED, the reference voltage applied to the operational amplifier is lowered. As a result, since an output voltage of the operational amplifier is lowered when the short circuit of the LED occurs, an increase in electric current that flows in the transistor is restrained. Therefore, the power loss of the transistor that functions as the electric current setting element can be reduced.

However, because the protection circuit of JP H09-331017 has a complicated circuit for controlling the electric current that flows in the light emitting element, the number of parts increases.

The operational amplifier and a reference signal that controls an electric current flowing in the circuit are required for the protection circuit of JP 2006-222377. Therefore, there are the following problems. Increasing the number of parts complicates the circuit configuration. In addition, a pulse width modulation (PWM) dimming means is not disclosed in JP 2006-222377. When the transistor that is connected in series to the LED is turned ON/OFF to perform the PWM dimming by applying an external signal, the detection unit that detects the current increment caused by the short circuit of the LED is required to have excellent responsiveness. When the detection unit including the operational amplifier has poor responsiveness, there is a possibility that a malfunction occurs in the protection circuit. Thus, because the performance characteristic of the protection circuit decreases, there is a concern that the protection circuit cannot deliver superior protection performance.

SUMMARY

In one embodiment of the present invention, a light emitting element drive device includes a timer circuit that operates based on a voltage of a connection point between a light emitting unit in which a plurality of light emitting elements are connected in series and a MOS field effect transistor (MOSFET) as a switching element. In the light emitting element drive device, because a switching operation of the MOSFET is forcibly stopped by the timer circuit, an abnormal current can be blocked off. The abnormal current flows by a short circuit of both terminals of the light emitting element by a flaw or defect of a connector, whiskers, or dropping foreign materials. An object of the present invention is to provide such a light emitting element drive device.

To achieve the above object, a light emitting element drive device according to one embodiment of the present invention includes a light emitting unit that includes a light emitting element and that performs dimming based on a pulse width modulation (PWM) signal, a first switching element that is turned ON or OFF based on the PWM signal and that is connected in series with the light emitting unit, and a protection circuit that includes a charging circuit and a second switching element. The second switching element is turned ON when a first voltage obtained by a charging operation of the charging circuit is equal to or more than a first predetermined value. The charging circuit discharges electric charge through the first switching element when a second voltage between input and output terminals of the first switching element drops. Then, the first switching element is turned OFF in despite of existence of the PWM signal when the second switching element is turned ON.

In the above situation, when the first switching element is turned OFF (or is in a cutoff region) or operates in an active region, the second voltage between the input and output terminals (between source and drain regions) of the first switching element reaches a high level. On the other hand, when the first switching element operates in a saturation region, the second voltage between the input and output terminals (between source and drain regions) of the first switching element reaches a low level. Therefore, the discharging operation of the charging circuit is performed when the first switching element operates in the saturation region. However, the discharging operation of the charging circuit is not performed when the first switching element operates in a non-saturation (active) region. Thus, when the operation of the first switching element is shifted to a state in which it operates in the non-saturation (active) region by flowing an abnormal current, the discharging operation is not normally performed. As a result, the first voltage obtained by the charging operation of the charging circuit is equal to or more than the first predetermined value. As discussed above, when the abnormal current flows, the first switching element is forcibly turned OFF.

According to another aspect of the present invention for the light emitting element drive device, the light emitting unit includes a plurality of light emitting elements that are connected in series.

According to another aspect of the present invention, the light emitting element drive device further includes a power supply circuit that supplies power, and a detection circuit that includes first and second circuits. The first circuit detects an output voltage of the power supply circuit. The second circuit provides a voltage value that varies by an electric current flowing through the first switching element to the power supply circuit. The power supply circuit controls the output voltage according to the voltage value. Then, the detection circuit increases the voltage value despite the electric current flowing through the first switching element when the output voltage is more than a second predetermined value.

When the output voltage of the power supply circuit exceeds the second predetermined value, the detection circuit increases the voltage value, which is provided to the power supply circuit, despite the electric current flowing through the first switching element. As a result, increasing of the output voltage of the power supply circuit is restrained. In other words, even if the output voltage of the power supply circuit increases when the first switching element is forcibly turned OFF by the protection circuit, the increasing of the output voltage is restrained by the detection circuit.

According to another aspect of the present invention for the light emitting element drive device, the charging circuit is configured with a resistance element and a capacitance element, and a time constant of the charging circuit is equal to or more than a frequency cycle of the PWM signal.

According to another aspect of the present invention, the light emitting element drive device further includes an alarm circuit that outputs an alarm signal when the detection circuit increases the voltage value despite the electric current flowing through the first switching element.

A light emitting element drive device according to another embodiment of the present invention includes a light emitting unit that includes a light emitting element and that performs dimming based on a pulse width modulation (PWM) signal, a switching element that is turned ON or OFF based on the PWM signal and that is connected in series with the light emitting unit, and a protection circuit that times a period for which a voltage between input and output terminals of the switching element is maintained as a voltage value that is equal to or more than a first predetermined value. The protection circuit provides an OFF signal to the switching element so as to turn off the switching element when the period is equal to or more than a second predetermined value. Then, the switching element is turned OFF despite the existence of the PWM signal when the switching element receives the OFF signal.

According to the present invention, when an abnormal current flows by a short circuit of terminals that supply an electric current to the light emitting unit by a flaw or defect of a connector, whiskers, dropping foreign materials, or misconnection, the abnormal state can be certainly detected so that the abnormal current can be blocked off without being influenced by a PWM driving that performs dimming of the light emitting unit.

In addition, because the number of parts for the protection circuit, such as the timer circuit, is few, a space for the circuit can be small. Further, the circuit is configured with low costs.

Each light emitting unit in which a plurality of light emitting elements are connected in series includes a converter, a MOSFET, and a timer circuit. Therefore, the light emitting unit can operate with high efficiency without being influenced by unevenness of forward voltage (VF) drops between the plurality of light emitting elements in a row.

BRIEF DESCRIPTION OF THE DRAWINGS

Embodiments according to the present invention will be described with reference to the accompanying drawings, wherein like numbers reference like elements.

DESCRIPTION OF EXEMPLARY EMBODIMENTS

Embodiments of a light emitting element drive device according to the present invention will be explained below with reference to the drawings. The light emitting element drive device includes a light emitting unit in which a plurality of light emitting elements are connected in series and a MOSFET as a switching element. The light emitting element drive device also includes a timer circuit that operates based on a voltage at a connection point between the light emitting unit and the MOSFET. When two terminals of a connector that connect the plurality of light emitting elements short out by a flaw or defect of the connector, whiskers, dropping foreign materials, or misconnection, the timer circuit forcibly stops a switching operation of the MOSFET so that the MOSFET is in an OFF state. Because the timer circuit operates as discussed above, the abnormal state can be certainly detected so that the abnormal current can be blocked off.

The light emitting element drive device is configured to drive a light emitting element, such as an LED, as a lighting system and as a backlight for a display device, such as a liquid crystal panel.

1. First Embodiment

Figure 1:
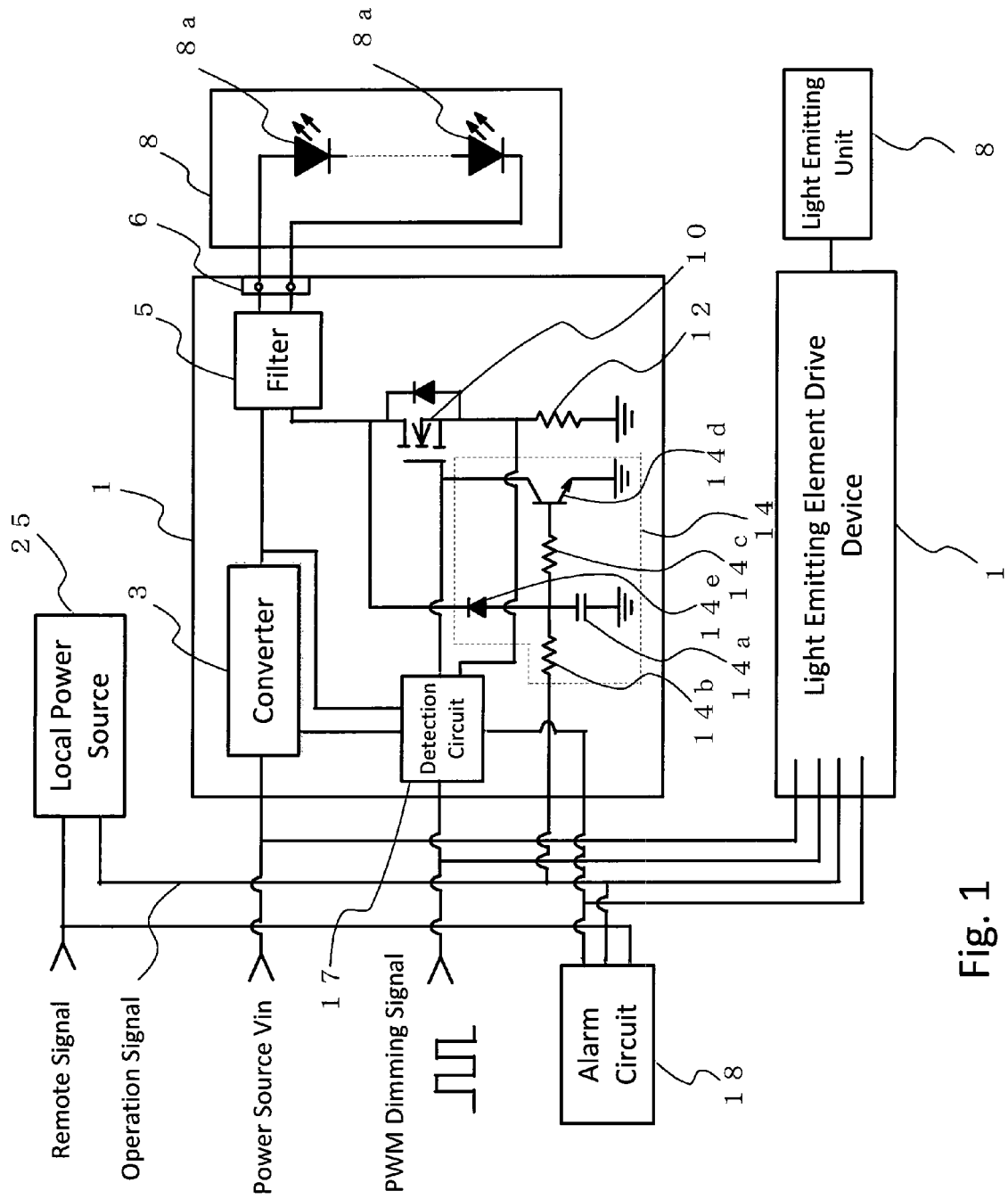
FIG. 1 is a block diagram of a light emitting element drive device according to a first embodiment of the present invention.
Figure 2:
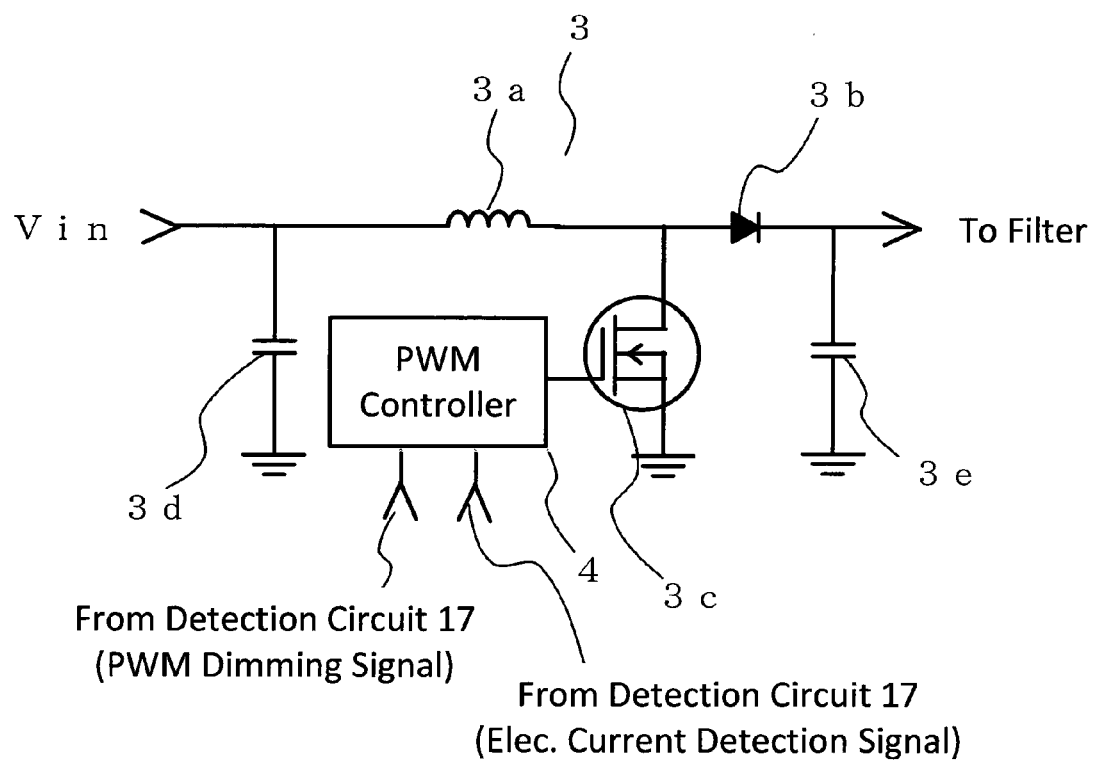
FIG. 2 is a schematic view of a converter of a light emitting element drive device according to the first embodiment of the present invention.
Figure 3A:
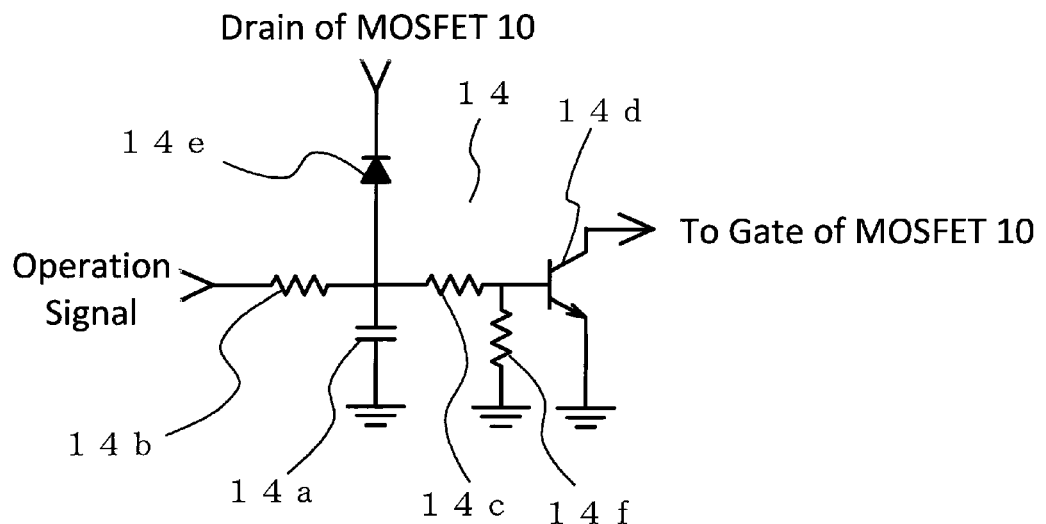
FIGS. 3A and 3B are circuit diagrams of a timer circuit of a light emitting element drive device according to other embodiments of the present invention.
Figure 3B:
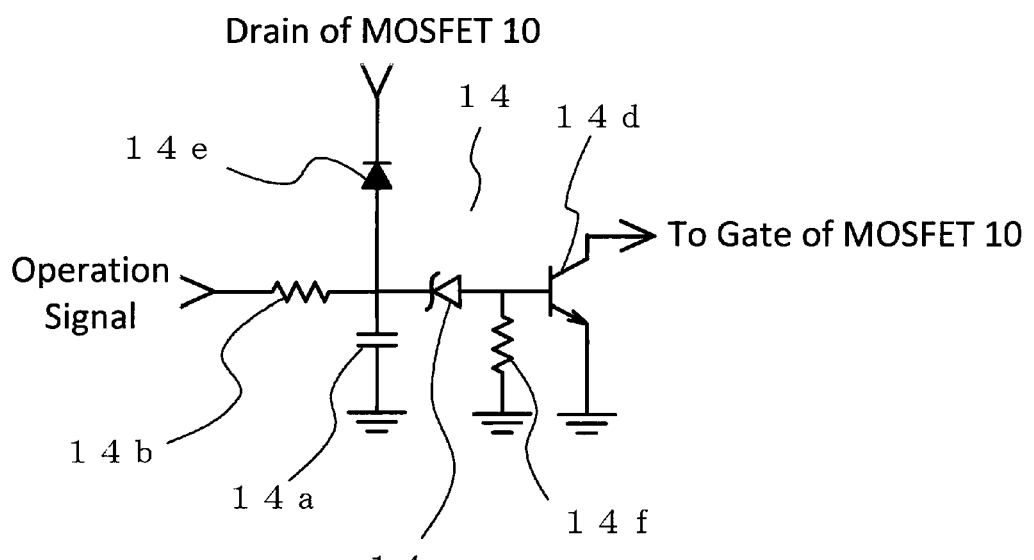
Figure 4:
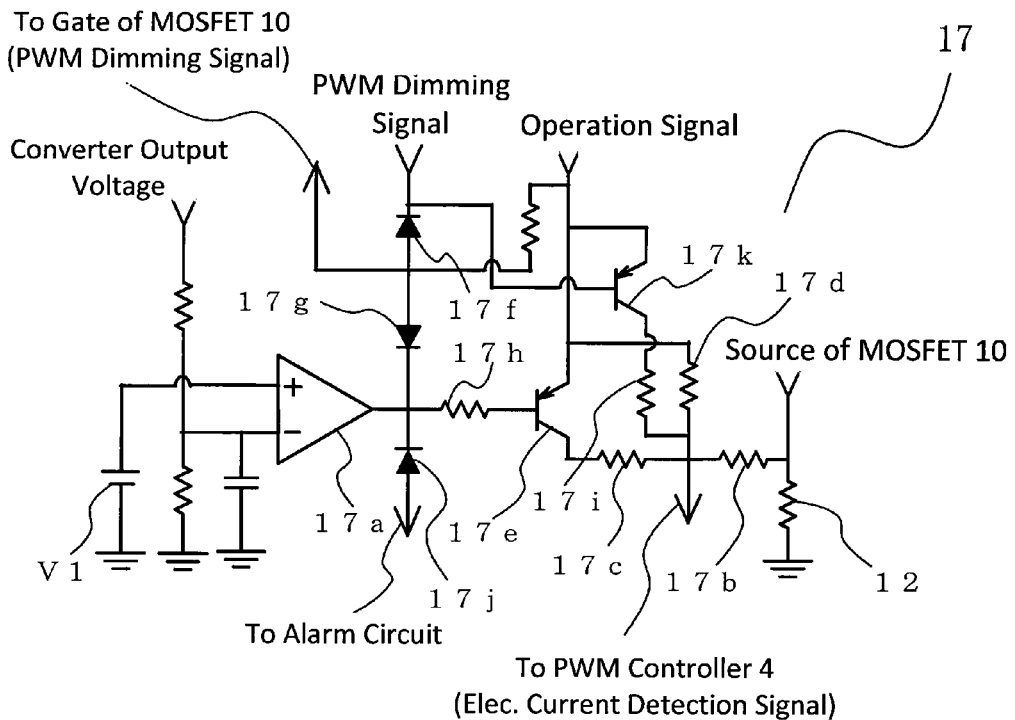
FIG. 4 is a circuit diagram of a detection circuit of a light emitting element drive device according to the first embodiment of the present invention.
Figure 5:
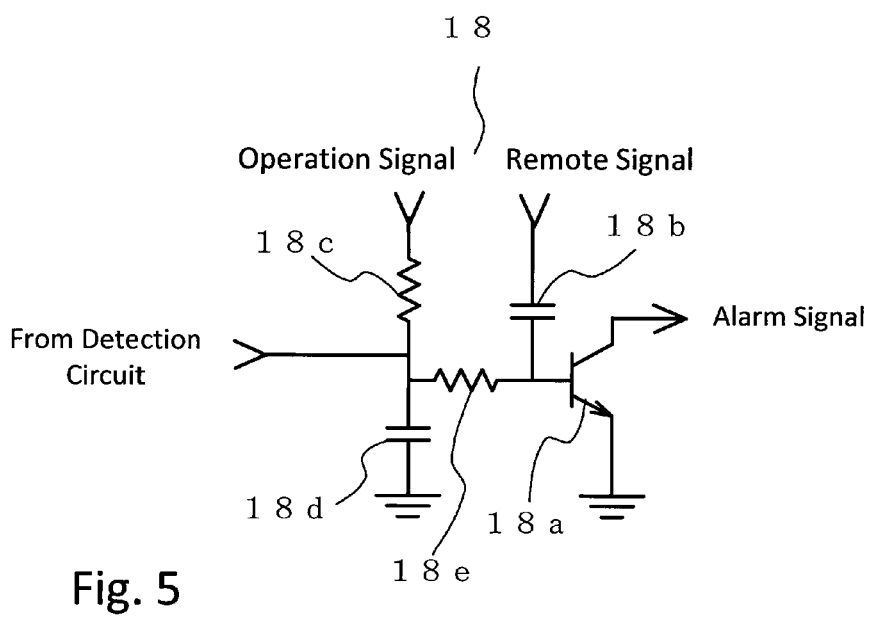
FIG. 5 is a circuit diagram of an alarm circuit of a light emitting element drive device according to the first embodiment of the present invention.

FIG. 1 is a block diagram of a light emitting element drive device 1 according to a first embodiment of the present invention. FIG. 2 is a schematic view of a converter of the light emitting element drive device 1. FIGS. 3A and 3B are circuit diagrams of a timer circuit of the light emitting element drive device 1 according to other embodiments. FIG. 4 is a circuit diagram of a detection circuit of the light emitting element drive device 1. FIG. 5 is a circuit diagram of an alarm circuit of the light emitting element drive device 1.

As shown in FIG. 1, the light emitting element drive device 1 is configured with a converter 3, a filter 5, a MOSFET 10 as a switching element, a timer circuit 14 (enclosed by a dotted line), and a detection circuit 17. Because the timer circuit 14 and the detection circuit 17 have protection functions, a protection circuit of the light emitting element drive device 1 is configured with the timer circuit 14 and the detection circuit 17. In the light emitting element drive device 1, a light emitting unit 8 in which a plurality of LEDs 8a as light emitting elements are connected in series is connected to a connector 6 that is connected to an output terminal of the filter 5 as shown in FIG. 1. The converter 3 converts an input voltage supplied by a power source Vin to an output voltage that is applied to the light emitting unit 8 based on an electric current detection signal provided by the detection circuit 17. The filter 5 is connected between the output of the converter 3 and the connector 6. The filter 5 reduces common mode noise. The MOSFET 10 controls an electric current flowing through the LEDs 8a of the light emitting unit 8 by performing switching operations (ON and OFF) based on a PWM dimming signal. When the timer circuit 14 detects an abnormal state, such as a short circuit between two terminals of the connector 6, the timer circuit 14 forcibly stops the switching operations of the MOSFET 10. When the detection circuit 17 detects an abnormal output voltage (overvoltage) of the converter 3, the detection circuit 17 lowers the output voltage of the converter 3 by adjusting the electric current detection signal provided to the converter 3. In FIG. 1, a plurality of light emitting element drive devices 1 share a local power source 25 and an alarm circuit 18.

As shown in FIG. 2, the converter 3 is a boost chopper type circuit. This circuit (the converter 3) is configured with a capacitor 3d that smoothes an input voltage, a coil 3a that stores energy, a diode 3b as a rectifying device, a FET 3c as a switching element, and a capacitor 3e that smoothes an output voltage. One terminal of the coil 3a is connected to the power source Vin. Another terminal of the coil 3a is connected to an anode of the diode 3b. The terminal of the coil 3a that is connected to the power source Vin is connected to a ground potential through the capacitor 3d. A cathode of the diode 3b is connected to the ground potential through the capacitor 3e. A drain of the FET 3c is connected to the anode of the diode 3b. A source of the FET 3c is connected to the ground potential. A PWM controller 4 supplies a driving signal to a gate of the FET 3c.

The FET 3c is turned ON and OFF (switching operation) according to the driving signal supplied by the PWM controller 4. When the FET 3c is turned ON, energy is stored at the coil 3a. When the FET 3c is turned OFF, the stored energy at the coil 3a is superimposed on the power source Vin and then they are output. A switching frequency of the FET 3c is, for example, about 1 MHz (megahertz). The output voltage can be controlled by adjusting a ratio of ON-periods to each cycle of the switching operation, i.e., a duty ratio. The PWM controller 4 adjusts the duty ratio of the driving signal, which is supplied to the FET 3c, based on the electric current detection signal provided by the detection circuit 17. While the MOSFET 10, which is turned ON and OFF based on the PWM dimming signal, is in an OFF-period, the switching operation of the FET 3c is stopped.

As discussed above, the protection circuit of the light emitting element drive device 1 is configured with the timer circuit 14 and detection circuit 17. The filter 5 prevents a malfunction of the protection circuit by noise that comes from an external source through the connector 6. The filter 5 is effective for restraining high frequency noise generated by the switching operation of the FET 3c that also functions as a switching element for the converter 3. It is preferred that the filter 5 is a common-mode filter. As explained above, the output voltage of the converter 3 is applied to the light emitting unit 8 through the filter 5.

The light emitting unit 8 in which the plurality of LEDs 8a are connected in series is connected to the light emitting element drive device 1 through the connector 6. The LEDs 8a that configure the light emitting unit 8 may be a single LED. Alternately, a single row is configured with the plurality of LEDs 8a that are connected in series. Then, the light emitting unit 8 in the single row is connected to the light emitting element drive device 1. As discussed above, the light emitting element drive device 1 controls the light emitting unit 8 in which the plurality of LEDs 8a are connected in series. Thus, when a plurality of light emitting units 8 are controlled, each light emitting element drive device is connected to each of the light emitting units 8.

An electric current flowing in the light emitting unit 8 flows only if the MOSFET 10 is turned ON. In other words, when the MOSFET is turned OFF, the electric current does not flow in the light emitting unit 8. The PWM dimming signal is supplied to a gate of the MOSFET 10 through the detection circuit 17. Therefore, the electric current flowing in the light emitting unit 8 is controlled according to the switching operation (ON and OFF) of the MOSFET 10 based on the PWN dimming signal. The electric current flowing in the light emitting unit 8 can be blocked off by stopping the switching operation of the MOSFET 10 according to a signal from the timer circuit 14 of the protection circuit.

As shown in FIGS. 1 and 4, one terminal of a resistor 12 is connected to a source of the MOSFET 10. Another terminal of the resistor 12 is connected to the ground potential. The electric current flowing in the light emitting unit 8 is detected based on a voltage drop in the resistor 12. As shown in FIG. 4, a connection point between the resistor 12 and the source of the MOSFET 10 is connected to an input terminal for the electric current detection signal of the PWM controller 4 through a resistor 17b. Further, the input terminal for the electric current detection signal of the PWM controller 4 is also connected to the operation signal through a resistor 17d, connected to a collector of a transistor 17e through a resistor 17c, and connected to a collector of a transistor 17k through a resistor 17i. In other words, a voltage, as the electric current detection signal, of a connection point among the resistors 17b, 17c, 17d and 17i is provided to the PWM controller 4 of the converter 3.

As shown in FIG. 1, the timer circuit 14 (enclosed by a dotted line) is configured with an integration circuit (charging circuit) including a capacitor 14a and a resistor 14b, a transistor 14d as a switching element, a resistor 14c that is connected between a base of the transistor 14d and a connection point between the capacitor 14a and the resistor 14b of the integration circuit, and a diode 14e that is connected between a drain of the MOSFET 10 and the connection point between the capacitor 14a and the resistor 14b of the integration circuit. An anode of the diode 14e is connected to the connection point between the capacitor 14a and the resistor 14b. A cathode of the diode 14e is connected to the drain of the MOSFET 10. The operation signal, as a power source, provided by the local power source 25 is supplied to the integration circuit including the capacitor 14a and the resistor 14b. The local power source 25 starts-up and stops according to a remote signal. When the MOSFET 10 is turned OFF by the PWM dimming signal, a drain voltage at the drain of the MOSFET 10 increases. As a result, the capacitor 14a is charged by the operation signal when the diode 14e is turned OFF. Further, when the MOSFET 10 is turned ON by the PWM dimming signal, the drain voltage of the MOSFET 10 decreases. As a result, electric charge stored at the capacitor 14a is discharged through the diode 14e. By discharging the electric charge, the timer circuit 14 reset is performed. In a steady state, although a voltage of the connection point between the capacitor 14a and the resistor 14c increases in an OFF-period of the MOSFET 10, the MOSFET 10 is turned ON by the PWM dimming signal before the transistor 14d is turned ON by that voltage. In other words, the transistor 14d is kept turned OFF because a voltage change of the connection point between the capacitor 14a and the resistor 14c is shifted from up to down before the transistor 14d is turned ON. When the timer circuit 14 performs the above operation, a time constant of the integration circuit of the timer circuit 14 is equal to or more than a cycle of a frequency of the PWM dimming signal. In contrast, when an overcurrent flows in the MOSFET 10 by, for example, a short circuit between the two terminals of the connector 6, the operation of the MOSFET 10 is shifted from performing in a saturation region to performing in a non-saturation (active) region. When the operation of the MOSFET 10 is shifted to performing in the non-saturation region, a voltage between the source and the drain of the MOSFET 10 increases. Thus, the electric charge stored at the capacitor 14*a* in an OFF-period of the MOSFET 10 is not discharged as opposed to the steady state. As a result, because a voltage keeps increasing by charging the capacitor 14*a*, the transistor 14*d* is turned ON by that voltage. Thereby, the MOSFET 10 is forcibly turned OFF because a gate voltage at the gate of the MOSFET 10 decreases when the transistor 14*d* is turned ON. In conclusion, the switching operation of the MOSFET 10 is stopped.

Note that the timer circuit 14 of the light emitting element drive device 1 is not limited to this embodiment as shown in FIG. 1. The timer circuit 14 can be configured with other structures. For example, as shown in FIG. 3A, a resistor 14*f* can be connected between the ground potential and the base of the transistor 14*d* of the timer circuit 14 shown in FIG. 1. Further, as shown in FIG. 3B, a Zener diode 14*g* can be used in place of the resistor 14*c* connected to the base of the transistor 14*d* of the timer circuit 14 shown in FIG. 3A. An anode of the Zener diode 14*g* is connected to the base of the transistor 14*d*. A cathode of the Zener diode 14*g* is connected to the capacitor 14*a*.

As shown in FIG. 4, in the detection circuit 17, a comparator 17*a* compares the output voltage of the converter 3 with a reference voltage V1. When the output voltage of the converter 3 exceeds the reference voltage V1, the comparator 17*a* generates an alarm signal. An output terminal of the comparator 17*a* is connected to a base of a transistor 17*e* through a resistor 17*h*. The PWM dimming signal is input to the detection circuit 17. The PWM dimming signal is input to a cathode of a diode 17*f* and to a base of a transistor 17*k*. An anode of the diode 17*f* is connected to an anode of a diode 17*g*. A connection point between the anodes of the diodes 17*f* and 17*g* is pulled-up (i.e., this connection point is connected to the operation signal through a resistor therebetween). The output terminal of the comparator 17*a* is connected to a cathode of the diode 17*g*. Therefore, when at least one of the PWM dimming signal and an output of the comparator 17*a* is at a low-level (nearly equal to the ground potential), the connection point between the anodes of the diodes 17*f* and 17*g* is at the low-level. A voltage at the connection point between the anodes of the diodes 17*f* and 17*g* is provided to the gate of the MOSFET 10 as the PWM dimming signal. The PWM dimming signal is, for example, a pulse wave form of a frequency of 200 Hz.

When the output voltage of the converter 3 is less than the reference voltage V1, the output of the comparator 17*a* has high impedance. Thus, the voltage at the connection point between the anodes of the diodes 17*f* and 17*g* is at a low-level or a high-level according to the PWM dimming signal. When the output of the comparator 17*a* has high impedance, the transistor 17*e* is turned OFF. When the output voltage of the converter 3 is equal to or more than the reference voltage V1, the output of the comparator 17*a* is at the low-level. When the output of the comparator 17*a* is at the low-level, the transistor 17*e* is turned ON so that a collector current of the transistor 17*e* flows in the resistor 17*c*, the resistor 17*b*, and the resistor 12 in this order. A voltage, as the electric current detection signal, that is provided to the PWM controller 4 increases by the collector current. Thus, the duty ratio of the driving signal, which is supplied to the FET 3*c* by the PWM controller 4, becomes small. The output of the comparator 17*a* is input to the alarm circuit 18 through a diode 17*j*.

A collector of the transistor 17*k* is connected to the input terminal for the electric current detection signal of the PWM controller 4 through a resistor 17*i*. Because the PWM dimming signal is input to the base of the transistor 17*k*, the transistor 17*k* is turned ON when the PWM dimming signal is at the low-level. When the transistor 17*k* is turned ON, a collector current of the transistor 17*k* flows in the resistor 17*i*, the resistor 17*b*, and the resistor 12 in this order. The voltage, as the electric current detection signal, that is provided to the PWM controller 4 increases by the collector current. The duty ratio of the driving signal, which is supplied to the FET 3*c*, is set to zero by increasing the voltage, as the electric current detection signal, that is provided to the PWM controller 4. Therefore, when the PWM dimming signal is at the low-level, the switching operation of the FET 3*c* is stopped.

The alarm circuit 18 outputs an alarm signal according to a signal from the detection circuit 17. As shown in FIG. 5, an output of the comparator 17*a* of the detection circuit 17 is input to the alarm circuit 18 through the diode 17*j*. Because a transistor 18*a* is turned ON and OFF according to the output of the comparator 17*a*, the alarm circuit 18 outputs the alarm signal in an open collector output format. The alarm circuit 18 is operable by the remote signal and the operation signal output from the local power source 25. Start-up and stop operations of the local power source 25 that is externally provided are controlled by the remote signal. A base of the transistor 18*a* is connected to a connection portion between a resistor 18*c* and a capacitor 18*d* through a resistor 18*e*. Thus, when the capacitor 18*d* is charged, the transistor 18*a* is turned ON. On the other hand, when the output of the comparator 17*a* is at the low-level, the electric charge stored at the capacitor 18*d* is discharged through the diode 17*j* so that the transistor 18*a* is turned OFF. At the time of start-up, because a response of the local power source 25 according to the remote signal is delayed, the transistor 18*a* of the alarm circuit 18 is kept turned ON until input of the operation signal by inputting the remote signal through a capacitor 18*b*. Note that the local power source 25 may be located inside of the light emitting element drive device 1.

As shown in FIG. 1, another light emitting element drive device 1 to which another light emitting unit 8 (rectangle shape) is connected has the same configuration discussed above. Power is supplied to each converter of each light emitting element drive device from the common power source Vin. The PWM dimming signal for dimming of each light emitting unit is a common input signal and is input to each detection circuit of each light emitting element drive device. After each output (output through each diode 17*j*) of each comparator 17*a* of each light emitting element drive device is connected together, the connected output is input to a single alarm circuit 18. In other words, when at least one of the outputs from the comparators 17*a* of the light emitting element drive devices 1 is at the low-level, the transistor 18*a* of the alarm circuit 18 is turned OFF. As discussed above, the light emitting element drive device 1 controls the light emitting unit 8 in a single row. Each light emitting element drive device 1 is provided for each light emitting unit 8.

Next, an operation of the light emitting element drive device 1 as discussed above will be explained with reference to FIGS. 1 through 5. As shown in FIG. 1, in the light emitting element drive device 1, power is supplied to the converter 3 from the power source Vin. The PWM dimming signal for dimming is input to the detection circuit 17 from the outside and further is provided to the gate of the MOSFET 10 through the detection circuit 17. The local power source 25 is started-up by the remote signal. The operation signal output from the local power source 25 is supplied to the timer circuit 14, the detection circuit 17, and the alarm circuit 18. In the steady state, when the PWM dimming signal that is input to the detection circuit 17 is at the high-level, the MOSFET 10 is turned ON. As a result, an electric current flows in the light emitting unit 8. In contrast, when the PWM dimming signal is at the low-level, the MOSFET is turned OFF. As a result, the electric current does not flow in the light emitting unit 8. In the steady state, when the PWM dimming signal is at the high-level, the MOSFET 10 is turned ON in the saturation region. Then, the electric current detection signal is input to the PWM controller 4 of the converter 3 through the detection circuit 17. The PWM controller 4 controls the output of the converter 3 so as to make an electric current flowing in the light emitting unit 8 constant. On the other hand, when the PWM dimming signal is at the low-level, the transistor 17k is turned ON. Thus, a voltage as the electric current detection signal that is supplied to the PWM controller 4 increases. As a result, the switching operation of the FET 3c of the converter 3 is stopped.

While the MOSFET 10 is turned ON according to the PWM dimming signal, the electric charge stored at the capacitor 14a of the timer circuit 14 is discharged through the diode 14e because the drain voltage of the MOSFET 10 decreases. Thus, the transistor 14d of the timer circuit 14 is kept turned OFF. As a result, the timer circuit 14 reset is performed. When the drain voltage is low while the MOSFET 10 is turned ON, the timer circuit 14 does not operate. Although the capacitor 14a of the timer circuit 14 is charged by the time constant of the integration circuit while the MOSFET 10 is turned OFF according to the PWM dimming signal, the MOSFET 10 is periodically turned ON at a timing that is determined by a frequency of the PWM dimming signal. Thus, because the electric charge stored at the capacitor 14a of the timer circuit 14 is discharged through the diode 14e at a predetermined cycle, the voltage does not reach a base-emitter voltage Vbe that is capable to turn ON the transistor 14d. As a result, the timer circuit 14 is kept turned OFF. As discussed above, the timer circuit 14 repeats charging and discharging operations of the capacitor 14a according to the PWM dimming signal. The time constant of the timer circuit 14 is equal to or more than a cycle of a frequency of the PWM dimming signal.

As discussed above, the dimming operation of the light emitting unit 8 is realized by turning ON and OFF operations of the MOSFET 10 according to the PWN dimming signal.

Next, in a case in which an abnormal current flows in a flowing line for an electric current for the light emitting unit, the detection of the abnormal current by the timer circuit and the stoppage of the switching operation of the MOSFET will be explained with reference to FIGS. 1 through 5.

The abnormal current is generated by the following reasons: a short circuit of the connector 6 that supplies an electric current to the light emitting unit 8 by a flaw or defect of the connector 6; the short circuit of adjacent terminals by whiskers; the short circuit by dropping conductive foreign materials; and the short circuit by misconnection. For example, when the short circuit of the connector 6 that supplies the electric current to the light emitting unit 8 occurs by the flaw or defect of the connector 6, the electric current from the converter 3 directly flows in the MOSFET 10 without flowing in the light emitting unit 8 because the short circuit occurs by connecting terminals of the filter 5. In this case, because an electric current that is larger than a normal electric current by several times flows between the source and the drain of the MOSFET 10, the operation of the MOSFET 10 is shifted from performing in the saturation region to performing in the non-saturation region. As a result, the voltage between the source and the drain increases. In the steady state, the timer circuit 14 performs the discharging of the capacitor 14a. However, in the abnormal state, the discharging of the capacitor 14a is blocked because the drain voltage of the MOSFET 10 increases by the abnormal current. Thus, when the capacitor 14a of the timer circuit 14 is kept charging for a period that is equal to or more than a predetermined time constant, the base-emitter voltage Vbe of the transistor 14d reaches an ON voltage (0.6 v-0.7 v) that is capable of turning ON the transistor 14d so that the transistor 14d is turned ON. The gate of the MOSFET 10 is at the low-level when the transistor 14d is turned ON. Thus, the MOSFET 10 is turned OFF and stops the switching operation. As a result, because the MOSFET 10 is turned OFF, the abnormal current caused by the short circuit is blocked off. In addition, because the MOSFET 10 is turned OFF, heat generation by the power dissipation of the MOSFET 10 can be prevented.

When the MOSFET 10 is forcibly turned OFF by the timer circuit 14, the output voltage of the converter 3 increases because a voltage value of the electric current detection signal is lowered. When the output voltage of the converter 3 increases and exceeds the reference voltage, the comparator 17a of the detection circuit 17 outputs a low-level signal. When the output of the comparator 17a is at the low-level, the transistor 17e in which the base is connected to the output of the comparator 17a through the resistor 17h is turned ON. An electric current flows from the collector of the transistor 17e toward the resistor 12 through the resistors 17b, 17c. Because the voltage value of the electric current detection signal that is input to the PWM controller 4 of the converter 3 increases by this electric current, the increasing of the output voltage of the converter 3 is restrained.

When the output of the comparator 17a is at the low-level, the gate voltage of the MOSFET 10 is at the low-level despite of the change of the PWM dimming signal. As a result, the MOSFET 10 is turned OFF. In addition, because the output of the comparator 17a is at the low-level, the low-level signal is output to the alarm circuit 18 so that the alarm signal is output.

As discussed above, the MOSFET 10 can be blocked or turned OFF by the timer circuit 14 in which the start-up and stop operations of the timer circuit 14 are performed by the drain voltage of the MOSFET 10. Therefore, the MOSFET 10 can be blocked or turned OFF when the timer circuit 14 detects the drain voltage changes, which are caused by the short circuit due to the flaw or defect of the connector 6, the whiskers, the dropping foreign materials, and the misconnection, of the MOSFET 10. As a result, the abnormal current can be blocked off by detecting the abnormal state with absolute certainty.

When a portion between the output of the converter 3 and the drain of the MOSFET 10 is open by a loose connection or disconnection, an electric current that flows in the light emitting unit 8 does not flow in the MOSFET 10 although the MOSFET 10 is turned ON. In other words, when the portion between the output of the converter 3 and the drain of the MOSFET 10 is open, only the discharged electric current from the capacitor 14a flows in the MOSFET 10. Therefore, because the voltage value of the electric current detection signal decreases, the output voltage of the converter 3 increases as a result. Then, when the output voltage of the converter 3 exceeds the reference voltage, the output of the comparator 17a is at the low-level in the detection circuit 17. Thus, the transistor 17e is turned ON. Because the transistor 17e is turned ON, the voltage value of the electric current detection signal increases. As a result, the increasing of the output voltage of the converter 3 is restrained.

2. Second Embodiment

Figure 6:
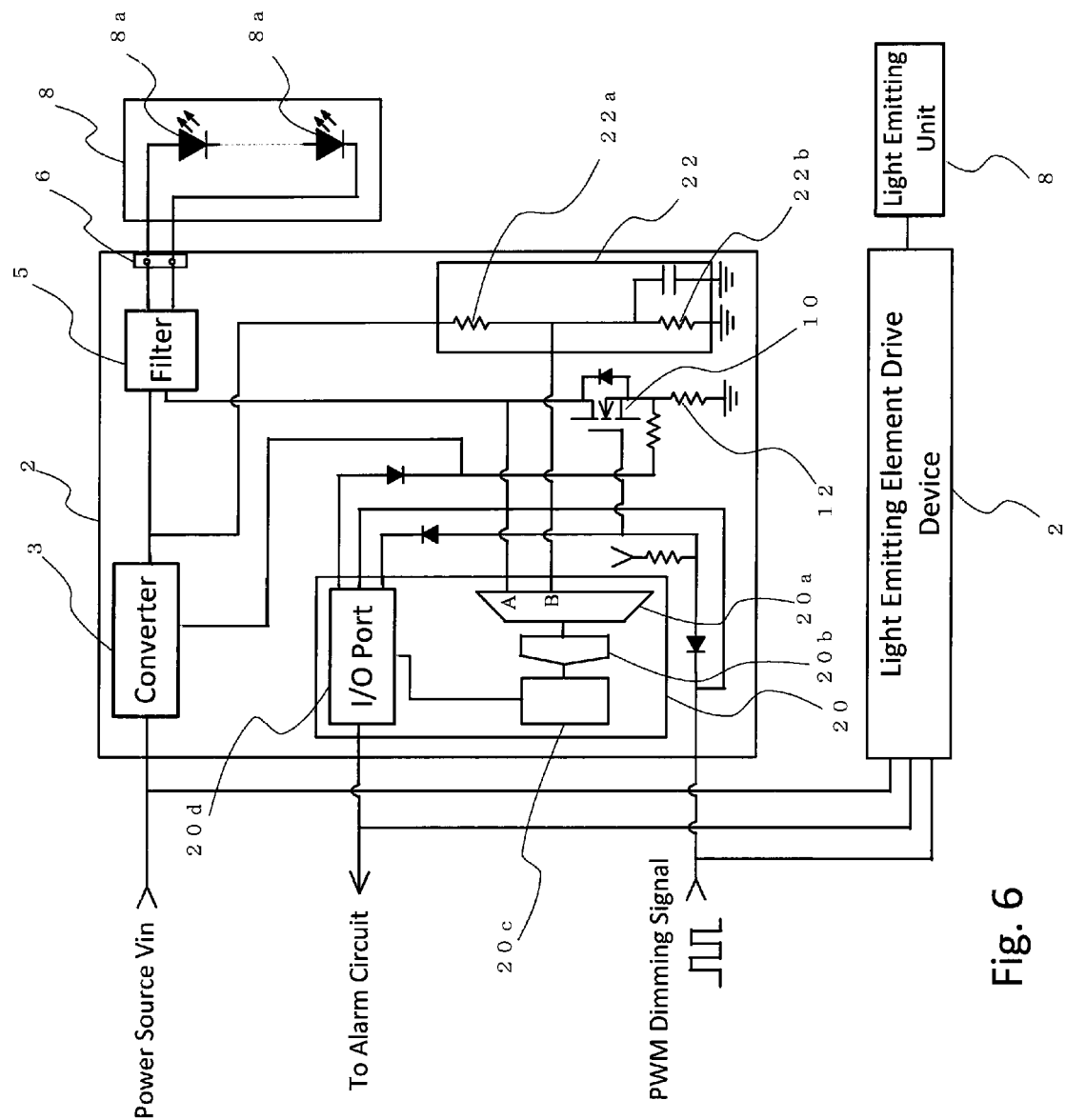
FIG. 6 is a block diagram of a light emitting element drive device according to a second embodiment of the present invention.

A second embodiment of a light emitting element drive device 2 according to the present invention will be explained below with reference to FIG. 6. FIG. 6 is a block diagram of the light emitting element drive device 2 according to the second embodiment of the present invention. FIG. 6 is the block diagram of the light emitting element drive device 2 that uses a microcomputer 20 in place of the detection circuit 17 and the timer circuit 14 as shown in FIG. 1. Reference numerals in FIG. 6 are the same as that of FIG. 1. The detailed explanations of their common configurations will be omitted. As shown in FIG. 6, the light emitting element drive device 2 is configured with the converter 3 that converts an input voltage to a predetermined voltage and outputs it, the filter 5 that is inserted in electric current supply lines, the light emitting unit 8 in which a plurality of LEDs are connected in series, the MOSFET 10 that applies and blocks an electric current, the resistor 12 for detecting the electric current, a converter output voltage detection unit 22, and the microcomputer 20.

The converter output voltage detection unit 22 shown in FIG. 6 performs voltage dividing by resistors 20a and 20b for the output voltage from the converter 3 and detects a voltage at a connection point between the resistors 20a and 20b. The microcomputer 20 shown in FIG. 6 is configured with a memory (not shown) storing a program, a CPU 20c, a multiplexer 20a that outputs a signal selected among a plurality of input signals, an A/D converter 20b that converts an analog signal received from the multiplexer 20a to a digital signal and outputs the digital signal to the CPU 20c, and an input/output port 20d. Note that the multiplexer 20a shown in FIG. 6 has a port A and a port B for input.

The drain voltage of the MOSFET 10 is input to the port A of the multiplexer 20a of the microcomputer 20. The voltage from the converter output voltage detection unit 22 is input to the port B of the multiplexer 20a of the microcomputer 20. The multiplexer 20a selectively outputs one of the drain voltage of the MOSFET 10 that is input to the port A and the voltage from the converter output voltage detection unit 22 that is input to the port B. The A/D converter 20b samples the drain voltage or the voltage by a predetermined sampling cycle, obtains the sampled voltage values, and provides them to CPU 20c as digital signals.

A timer operation of the microcomputer 20 is to sample the drain voltage of the MOSFET 10 by the predetermined sampling cycle. When the sampled drain voltage of the MOSFET 10 is equal to or more than a predetermined first reference voltage value, the CPU 20c increases the value of a counter. When the sampled drain voltage is less than the first reference voltage value, the CPU 20c resets the count-value of the counter. When the count value of the counter reaches a predetermined reference count value, the CPU 20c instructs the input/output port 20d to output a low-level timer output signal. A gate of the MOSFET 10 is at the low-level according to the low-level timer output signal. Thus, the MOSFET 10 is turned OFF. Note that the gate of the MOSFET 10 is pulled-up. When the PWM dimming signal or the timer output signal is at the low-level, the gate of the MOSFET 10 is at the low-level. Thus, the MOSFET 10 is turned OFF.

On the other hand, when the microcomputer 20 checks the output voltage of the converter 3, the microcomputer 20 samples a detection voltage of the converter output voltage detection unit 22 at a predetermined sampling cycle. When the sampled detection voltage is equal to or more than a predetermined second reference voltage value, the CPU 20c instructs the input/output port 20d to output a high-level abnormal voltage detection signal. When the abnormal voltage detection signal is at the high-level, the voltage value of the electric current detection signal, which is input to the PWM controller 4 of the converter 3, increases. As a result, the increasing of the output voltage of the converter 3 is restrained. Further, the CPU 20c instructs the input/output port 20d to output a signal, which notifies the abnormal voltage detection signal is at the high-level, to an external alarm circuit. When the PWM dimming signal is at the low-level, the input/output port 20d outputs the high-level signal. As a result, because the voltage value of the electric current detection signal increases, the switching operation of the converter 3 is stopped.

As discussed above, according to the present invention, when the abnormal current flows by the short circuit of terminals that supply an electric current to the light emitting unit by a flaw or defect of a connector, whiskers, dropping foreign materials, or misconnection, the abnormal state can be certainly detected so that the abnormal current can be blocked off without being influenced by a PWM dimming operation that performs dimming of the light emitting unit.

Further, according to the present invention, it is not necessary to provide an overcurrent detection resistor that detects an overcurrent flowing in a light emitting element between the power source and the drive device by which an electric current flows in the light emitting element. Therefore, there is less or no loss capability by an overcurrent detection resistor so that greater efficiency is promoted.

In addition, because the number of parts for the protection circuit, such as the timer circuit, is few, a space for the circuit can be small. Further, the circuit is configured with low costs.

Each light emitting unit in which a plurality of light emitting elements are connected in series includes a converter, a MOSFET, and a timer circuit. Therefore, the light emitting unit can operate with high efficiency without being influenced by unevenness of forward voltage (VF) drops between the plurality of light emitting elements in a row.

The light emitting element drive device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A light emitting element drive device, comprising:
   a light emitting unit that includes a light emitting element and that performs dimming based on a pulse width modulation (PWM) signal;
   a first switching element that is turned ON or OFF based on the PWM signal that is input to a gate of the first switching element via a first node, a drain of the first switching element being connected in series with the light emitting unit via a second node, a source of the first switching element being connected to a ground potential; and
   a protection circuit that includes a charging circuit and a second switching element, a collector of the second switching element being connected to a gate of the first switching element via the first node, an emitter of the second switching element being connected the ground potential, a base of the second switching elemet being connected to the charging circuit via a third node,
   wherein the second switching element is turned ON when a first voltage of the third node obtained by a charging operation of the charging circuit is equal to or more than a first predetermined value, the charging circuit discharges electric charge through the first switching element when a second voltage of the second node drops, and the first switching element is turned OFF despite existence of the PWM signal when a third voltage of the first node is clamped to the ground potential by turning ON the second switching element.

2. The light emitting element drive device, according to claim 1, wherein
the light emitting unit includes a plurality of light emitting elements that are connected in series.

3. The light emitting element drive device, according to claim 2, wherein
the charging circuit is configured with a resistance element and a capacitance element that are connected via the third node, and
a time constant of the charging circuit is equal to or more than a frequency cycle of the PWM signal.

4. The light emitting element drive device, according to claim 1, wherein
the charging circuit is configured with a resistance element and a capacitance element that are connected via the third node, and
a time constant of the charging circuit is equal to or more than a frequency cycle of the PWM signal.

5. A light emitting element drive device, comprising:
a light emitting unit that includes a light emitting element and that performs dimming based on a pulse width modulation (PWM) signal;
a switching element that is turned ON or OFF based on the PWM signal and that is connected in series with the light emitting unit; and
a protection circuit that times a period for which a voltage between input and output terminals of the switching element is maintained as a voltage value that is equal to or more than a first predetermined value, the process circuit that resets the timed period when the voltage value is less than the first predetermined value,
wherein the protection circuit provides an OFF signal to the switching element so as to turn off the switching element when the period is equal to or more than a second predetermined value, and
the switching element is turned OFF despite existence of the PWM signal when the switching element receives the OFF signal.

6. The light emitting element drive device, according to claim 5, wherein
the light emitting unit includes a plurality of light emitting elements that are connected in series.

7. A light emitting element drive device, comprising:
a light emitting unit that includes a light emitting element and that performs dimming based on a pulse width modulation (PWM) signal;
a first switching element that is turned ON or OFF based on the PWM signal and that is connected in series with the light emitting unit;
a protection circuit that includes a charging circuit and a second switching element;
a power supply circuit that supplies power; and
a detection circuit that includes first and second circuits, wherein
the second switching element is turned ON when a first voltage obtained by a charging operation of the charging circuit is equal to or more than a first predetermined value,
the charging circuit discharges electric charge through the first switching element when a second voltage between input and output terminals of the first switching element drops,
the first switching element is turned OFF despite existence of the PWM signal when the second switching element is turned ON,
the first circuit detects an output voltage of the power supply circuit,
the second circuit provides a voltage value that varies by an electric current flowing through the first switching element to the power supply circuit,
the power supply circuit controls the output voltage according to the voltage value, and
the detection circuit increases the voltage value despite the electric current flowing through the first switching element when the output voltage is more than a second predetermined value.

8. The light emitting element drive device, according to claim 7, wherein
the charging circuit is configured with a resistance element and a capacitance element, and
a time constant of the charging circuit is equal to or more than a frequency cycle of the PWM signal.

9. The light emitting element drive device, according to claim 8, further comprising
an alarm circuit that outputs an alarm signal when the detection circuit increases the voltage value despite the electric current flowing through the first switching element.

10. The light emitting element drive device, according to claim 7, further comprising
an alarm circuit that outputs an alarm signal when the detection circuit increases the voltage value despite the electric current flowing through the first switching element.

* * * * *